United States Patent
Paspek et al.

(10) Patent No.: US 12,528,942 B2
(45) Date of Patent: Jan. 20, 2026

(54) ASPHALT EMULSIONS COMPRISING PURIFIED HYDROCARBONACEOUS MATERIALS AS A STABILIZER

(71) Applicant: ARQ IP LIMITED, London (GB)

(72) Inventors: Stephen Carl Paspek, Broadview Heights, OH (US); John Francis Unsworth, Conway (GB); Jeramie Joseph Adams, Laramie, WY (US); Jean-Pascal Planche, Laramie, WY (US); Rumman Ahmed, Reading (GB)

(73) Assignee: Arq IP Limited, London (GB)

( * ) Notice: Subject to any disclaimer, the term of this patent is extended or adjusted under 35 U.S.C. 154(b) by 552 days.

(21) Appl. No.: 18/057,934

(22) Filed: Nov. 22, 2022

(65) Prior Publication Data

US 2023/0092865 A1     Mar. 23, 2023

Related U.S. Application Data

(63) Continuation-in-part of application No. PCT/US2022/030017, filed on May 19, 2022.

(60) Provisional application No. 63/191,428, filed on May 21, 2021.

(51) Int. Cl.
*C08L 95/00* (2006.01)
*C08L 97/00* (2006.01)

(52) U.S. Cl.
CPC ............ *C08L 95/005* (2013.01); *C08L 97/002* (2013.01); *C08L 2201/08* (2013.01); *C08L 2555/74* (2013.01)

(58) Field of Classification Search
CPC .. C08L 95/005; C08L 97/002; C08L 2201/08; C08L 2555/74; C08L 2555/32; C08K 3/04
See application file for complete search history.

(56) References Cited

U.S. PATENT DOCUMENTS

| | | | |
|---|---|---|---|
| 2,629,669 A | 2/1953 | Anderton et al. | |
| 3,264,957 A | 8/1966 | Schlesinger et al. | |
| 4,966,608 A | 10/1990 | Pawlak et al. | |
| 7,097,703 B2 * | 8/2006 | Boyer | C09D 4/00 106/277 |
| 2013/0195551 A1 * | 8/2013 | McDade | E01C 7/24 404/75 |
| 2017/0022437 A1 * | 1/2017 | Snaith | C10L 1/322 |

FOREIGN PATENT DOCUMENTS

WO     2020065341 A1     4/2020

OTHER PUBLICATIONS

International Search Report and Written Opinion dated Sep. 13, 2022, pertaining to Int'l Patent Application No. PCT/US2022/030017, 10 pgs.

* cited by examiner

*Primary Examiner* — Amber R Orlando
*Assistant Examiner* — Anastasia A. Kuvayskaya
(74) *Attorney, Agent, or Firm* — Dinsmore & Shohl LLP

(57) ABSTRACT

An oil-in-water emulsion comprising an asphalt and purified coal product (PCP) is provided, wherein the PCP is in particulate form, and wherein at least about 90% by volume (% v) of the particles are no greater than about 25 μm in diameter; wherein the PCP has an ash content of less than about 10 wt %. Methods are also provided for the use of PCP as a stabilizing additive in the manufacture of asphalt containing emulsions.

22 Claims, 4 Drawing Sheets

ASPHALT EMULSIONS COMPRISING PURIFIED HYDROCARBONACEOUS MATERIALS AS A STABILIZER

CROSS-REFERENCE TO RELATED APPLICATIONS

This application is a continuation-in-part of International Application Serial No. PCT/US2022/030017 filed May 19, 2022, which claims the benefit of U.S. Provisional Application Ser. No. 63/191,428 filed May 21, 2021, the entire disclosures of which are hereby incorporated herein by reference.

FIELD

The invention relates to manufacture of asphalt or bitumen binders for use in the manufacture of asphalt concrete for surface paving applications.

BACKGROUND

Coal fines and ultrafines, including microfines, are the small particles of coal generated from larger lumps of coal during the mining and preparation process. They are generally considered a waste product as the particulate nature of the product renders it difficult to exploit commercially and to transport safely. As much as 70-90 million tonnes of coal fines are produced in the US alone as waste by-product every year by the mining industry (Baruva, P., Losses in the coal supply chain, IEA Clean Coal Centre Rep.CCC/212, p. 26, December 2012, ISBN 978-92-9029-532-7), the vast majority of which is left unused. Coal fines are therefore generally discarded as spoil close to the colliery forming large waste heaps or contained in large ponds that require long term management in order to avoid environmental contamination.

Coal seams with high ash content are abundant worldwide, from numerous geological reserves, sometimes as thick seams persisting over a wide geographical area, but many are not exploitable economically due to high ash content (at least 15-20 wt % dry basis), high sulfur content (1-2 wt % dry basis), moderately high water content (10-15 wt % or higher) and with a relatively coarse particle size distribution (<50 mm).

Clean coal technologies have provided for development of new classes of specialty fuels that comprise upgraded clean coal blends as described in International Patent Application No. WO2020/065341 or hybrid liquid-solid mixtures as described in U.S. Pat. No. 9,777,235, with higher energy density and lower levels of emissions. However, with increasing international awareness of the imperative to reduce carbon emissions there is a further need to identify valuable non-combustible uses for clean coal compositions derived from waste. In this way low-grade solid hydrocarbons can provide increased contributions to the improvement of the expanding global green economy. Hence, it would be desirable to provide alternative and economical sources of high-quality feedstocks for a range of non-fuel technologies which in turn bring about longer term, more sustainable, and greener future for communities that are currently dependent upon the coal industry for their economic wellbeing.

Paving grade bitumen, called 'asphalt, asphalt binder, or asphalt cement' in the US, is the black carbonaceous material which binds together rock and mineral aggregates and fillers to produce the asphalt aggregate mixture, asphalt concrete, or tarmac, that is used in road surfacing and other pavements. About 21 million tons of asphalt are used in the US annually, where asphalt paving is used for 93% of all road surfaces (Asphalt Pavement Industry Survey on Recycled Materials and Warm-Mix Asphalt Usage 2019. National Asphalt Pavement Association. Information Series 138). Since asphalt is primarily a derivative of the petroleum industry its prices usually trend with crude oil price with some delay. Several additives are added to asphalt to either improve its application or paving performance properties. Performance enhancing additives are materials such as polymers, surfactants, adhesion promoters or materials such as engine oil bottoms to soften oxidized (also referred to as aged) asphalt or hard grade asphalts to help in meeting lower temperature specifications. Asphalt is the most recycled material in the world and there is a constant development of additives to help soften old aged (oxidized) asphalt from RAP (reclaimed asphalt pavement) or RAS (reclaimed asphalt shingle) so that it can continue to be reused. Other materials which are added to the pavement—as a way to upcycle/recycle the materials include: ground tire rubber (GTR), polymer fibers and plastics. With additional chemistry, formulations and processing, GTR has been developed into an additive that improves asphalt performance, as well as a way to dispose of and upcycle rubber from waste tires through dry or wet processes. There is currently a growing amount of research being performed to compatibilize plastics in asphalt, or to add it directly into the hot mix as an aggregate. However, asphalt additives are typically used to affect the performance of the resulting pavement in terms of ease of application (termed 'workability') or environmentally conscious paving practices (warm-mix, cold-mix, and emulsions) as well as long term durability (cracking, deforming and rutting) and resistance to weathering (oxidation and moisture). Increasingly, asphalt compositions are also required to meet ever more stringent environmental and health protection standards that control aspects such as odor and carcinogenicity of asphalt fumes. Hence, asphalt cannot be considered simply as a convenient reservoir for a variety of industrial waste materials. Rather, all asphalt additives should provide a useful and cost-effective contribution to the overall properties of the composition if they are to be considered as suitable for inclusion in compositions for paving and road building.

It would be desirable, therefore, to provide improved feedstocks for use in the production of asphalt compositions and pavements. It would also be desirable to provide improved feedstocks that comprise a greater diversity of starting materials, but which meet the stringent requirements for inclusion in asphalts around the world. In addition, it would be desirable to utilize feedstocks that are derived from materials otherwise classified as discard, thereby allowing for upcycling of waste and reducing the further accumulation of waste fines as a by-product of the coal mining industry.

SUMMARY OF THE INVENTION

The invention relates to improvements in processes for the production of asphalt binders, asphalt cement and asphalt emulsions, having improved properties including higher durability and improved performance across a range of climatic conditions.

The present inventors have developed a process that provides for the utilization of very high quality (low ash, sulfur, and water content) purified coal products as an additive for asphalt. These purified coal products have typically been upgraded from waste from coal tailings ponds, impoundments or tips and reject materials from current coal production processing (e.g. thickener underflow or tailings underflow waste streams), as well as high-ash content inferior seam coal, hitherto not exploitable economically.

According to a first aspect of the present invention, there is provided a process for the production of an asphalt binder, the process comprising the steps of:
(i) providing a purified coal product (PCP), wherein the PCP is in particulate form, and wherein at least about 90% by volume (% v) of the particles are no greater than about 25 μm in diameter; wherein the PCP has an ash content of less than about 10 wt % and a water content of less than around 5 wt %; and
(ii) combining the PCP with an asphalt feedstock to create a combined blended mixture;
wherein the combined blended mixture comprises at least around 0.1 wt % and at most around 50 wt % PCP.

A second aspect of the invention provides an asphalt binder composition comprising a combination of an asphalt and a purified coal product (PCP), wherein the PCP is in particulate form, and wherein at least about 90% by volume (% v) of the particles are no greater than about 25 μm in diameter; wherein the PCP has an ash content of less than about 10 wt % and a water content of less than around 5 wt %; wherein the combined blended mixture comprises at least around 0.1 wt % and at most around 50 wt % PCP.

A third aspect provides for an asphalt concrete, wherein the asphalt concrete comprises an asphalt binder as described herein in combination with aggregate.

A fourth aspect of the invention provides a method of using a purified coal product (PCP), wherein the PCP is in particulate form, and wherein at least about 90% by volume (% v) of the particles are no greater than about 25 μm in diameter; wherein the PCP has an ash content of less than about 5 wt % and a water content of less than around 5 wt %, as an additive for increasing the stiffness of an asphalt binder.

A fifth aspect of the invention provides a method of using a purified coal product (PCP), wherein the PCP is in particulate form, and wherein at least about 90% by volume (% v) of the particles are no greater than about 25 μm in diameter; wherein the PCP has an ash content of less than about 5 wt % and a water content of less than around 5 wt %, as an additive for increasing the upper temperature performance of an asphalt binder.

A fifth aspect of the invention provides a oil-in-water emulsion comprising an asphalt and a purified coal product (PCP), wherein the PCP is in particulate form, wherein at least about 90% by volume (% v) of the particles are no greater than about 25 μm in diameter; and wherein the PCP has an ash content of less than about 10 wt %.

A sixth aspect of the invention provides a method of stabilizing an asphalt-in-water emulsion, the method comprising adding a purified coal product (PCP) to the emulsion, wherein the PCP is in particulate form, and wherein at least about 90% by volume (% v) of the particles are no greater than about 25 μm in diameter; wherein the PCP has an ash content of less than about 10 wt %; and wherein the PCP is added in an amount to the emulsion such that the emulsion comprises a PCP/(asphalt+PCP) ratio of at least 0.01.

It will be appreciated that the invention may be subjected to further combinations of the features disclosed herein but which are not explicitly recited above.

DRAWINGS

The invention is further illustrated by reference to the accompanying drawings in which:

FIG. 1 shows graphs demonstrating correlations between unaged and rolling thin film oven (RTFO) aged continuous upper temperature performance grade (UTPG) versus amount of PCP or limestone present in the mixture (as wt % solids). A shaded circle shows 30% limestone sample which does not fit the trend. For both graphs the upper line is for PCP mixtures and the lower line for limestone mixtures.

DETAILED DESCRIPTION OF THE INVENTION

Figure 1:
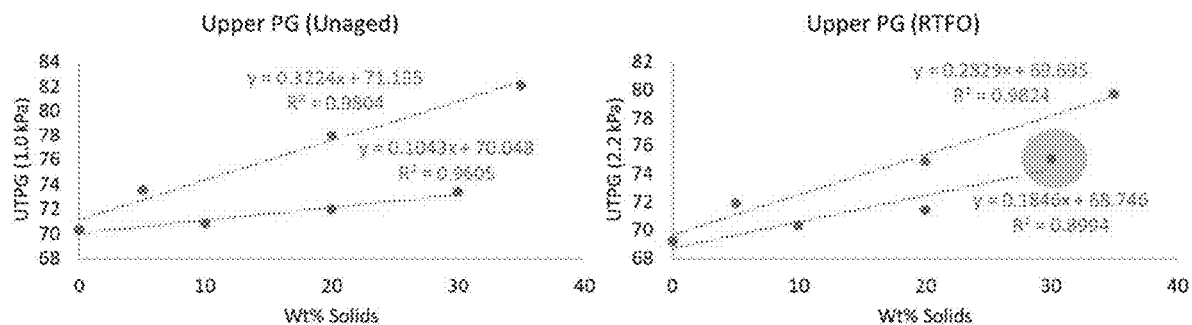

All references cited herein are incorporated by reference in their entirety. Unless otherwise defined, all technical and scientific terms used herein have the same meaning as commonly understood by one of ordinary skill in the art to which this invention belongs.

Prior to setting forth the invention in greater detail, a number of definitions are provided that will assist in the understanding of the invention.

As used herein, the term "comprising" means any of the recited elements are necessarily included and other elements may optionally be included as well. "Consisting essentially of" means any recited elements are necessarily included, elements that would materially affect the basic and novel characteristics of the listed elements are excluded, and other elements may optionally be included. "Consisting of" means that all elements other than those listed are excluded. Embodiments defined by each of these terms are within the scope of this invention. As used herein, the term "about" refers to a value that is within a tolerance of 1% above or below the absolute value being described.

The term "coal" is used herein to denote readily combustible sedimentary mineral-derived solid hydrocarbonaceous material including, but not limited to, hard coal, such as anthracite; bituminous coal; sub-bituminous coal; and brown coal including lignite (as defined in ISO 11760:2005). "Native" or "feedstock" coal refers coal that has not been subjected to extensive processing and comprises a physical composition (e.g. maceral content) that is substantially unchanged from the point of extraction. In contrast, the terms "coal-derived product", "coal replacement product" and "purified coal product (PCP)" are used herein to refer to various coals which have been subjected to one or more processes that lead to a change in physical and/or chemical compositions of the coal such that it is substantially changed from the point of extraction—i.e the un-modified or un-refined natural state.

As used herein, the term "ash" refers to the inorganic—e.g. non-hydrocarbon—mineral component found within most types of fossil fuel, especially that found in coal. Ash is comprised within the solid residue that remains following combustion of coal, sometimes referred to as fly ash. As the source and type of coal is highly variable, so is the composition and chemistry of the ash. However, typical ash content includes several oxides, such as silicon dioxide, calcium oxide, iron (III) oxide and aluminium oxide. Depending on its source, coal may further include in trace amounts one or more substances that may be comprised within the subsequent ash, such as arsenic, beryllium, boron, cadmium, chromium, cobalt, lead, manganese, mercury, molybdenum, selenium, strontium, thallium, and vanadium.

As used herein the term "low ash coal" refer to native coal that has a proportion of ash-forming components that is lower when compared to other industry standard coals. Typically, a low ash native or feedstock coal will comprise less than around 12 wt % ash. The term "deashed coal", or the related term "demineralised coal", is used herein to refer to coal that has a reduced proportion of inorganic minerals compared to its natural native state. Ash content may be determined by proximate analysis of a coal composition as described in ASTM D3174-12 Standard Test Method for Ash in the Analysis Sample of Coal and Coke from Coal. In embodiments of the present invention ash content in purified coal product of less than 10 wt %, less than 8 wt %, less than 5 wt % and less than 2 wt % or even less than 1 wt % are obtained. Indeed, the present inventors have found quite unexpectedly that products having very low ash contents of around or below 1 wt % can be obtained from starting material that is as much as 50 wt % ash without having to sacrifice yield levels that render the process un-commercial.

Inferior coal is a term used in geological survey of the quality of coal seams (e.g. UK coal survey, 1937) and refers to intrinsic ash in coal bands or coal seams above 15.1 wt % and below 40.0 wt %. Coal bands or coal seams consisting of inferior coal contain mineral matter intimately mixed within the coal itself and consequently are very difficult to purify using conventional coal processing techniques.

As used herein, the term "coal fines" refers to coal in particulate form with a maximum particle size typically less than 1.0 mm. The term "coal ultrafines" or "ultrafine coal" or "ultrafines" refers to coal with a maximum particle size typically less than 0.5 mm (500 microns (μm), approximately 0.02 inches). The term "coal microfines" or "microfine coal" or "microfines" refers to coal with a maximum particle size typically less than 20 μm.

Most suitably the particle size of the coal fines that is utilized as feedstock may be at most 1000 μm or 500 μm. Specifically, the maximum average particle size may be at most 500 μm. More suitably, the maximum average particle size may be at most 300 μm, 250 μm, 200 μm, 150 μm, or 100 μm. Most suitably, the maximum average particle size may be at most 75 μm, 50 μm, 40 μm, 30 μm, 20 μm, 10 μm, or 5 μm. The minimum average particle size may be 0.01 μm, 0.1 μm, 0.5 μm, 1 μm, 2 μm, or 5 μm. Hence, in particular embodiments the invention includes utilisation of nanoscale coal fines with average particle sizes in the sub-micron range.

An alternative measure of particle size is to quote a maximum particle size and a percentage value or "d" value for the proportion by volume of particles within the sample that fall below that particle size. For the present invention, any particle size of coal fines that is suitable for use as an additive for blending with asphalt/bitumen (i.e. an asphalt binder) is considered to be encompassed by the invention.

Suitably, the particle size of the coal fines is in the ultrafine range. Most suitably the particle size of the coal fines is in the microfine range. Specifically, the maximum particle size may be at most 500 μm. More suitably, the maximum particle size may be at most 300 μm, 250 μm, 200 μm, 150 μm, or 100 μm. Most suitably, the maximum particle size may be at most 75 μm, 50 μm, 40 μm, 30 μm, 25 μm, 20 μm, 15 μm, 10 μm, or 5 μm. The minimum particle size may be 0.01 μm, 0.1 μm, 0.5 μm, 1 μm, 2 μm, or 5 μm. Any "d" value may be associated with any one of these particle sizes. Suitably, the "d" value associated with any of the above maximum particle sizes may be d99, d98, d95, d90, d80, d70, d60, or d50. A d value represents a mass division diameter; it is the diameter which, when all particles in a sample are arranged in order of ascending mass, divides the sample's mass into specified percentages. The percentage mass of the composition below the diameter of interest is the number expressed after the "d". Hence, a d90 of 10 μm indicates that 90 percent of the mass of the composition is comprised within particles of less than 10 μm in diameter. To maximize the chemical and physical interaction of micronized coal with asphalt binder it is desirable for the coal particle size to be both relatively homogeneous and small, in order to enable the small particles to be well-dispersed in the liquid asphalt phase. For instance, in a specific embodiment of the invention the microfine coal has a d90 or higher of <100 μm, <90 μm, <70 μm, <50 μm, <25 μm, optionally <20 μm, suitably <10 μm. In some embodiments of the invention, the microfine coal has a d99 of <70 μm, <60 μm, <50 μm, <40 μm, <25 μm, optionally <20 μm, suitably <10 μm.

As used herein, the term "water content" refers to the total amount of water within a sample of coal fines and is expressed as a concentration or as a mass or weight percentage (% m or wt %). When the term refers to the water content in a coal sample it includes the inherent or residual water content of the coal, and any water or moisture that has been absorbed from the environment. As used herein the term "dewatered coal" refers to coal that has an absolute proportion of water that is lower than that of its natural state. The term "dewatered coal" may also be used to refer to coal that has a low, naturally occurring proportion of water. Water content may be determined by analysis of a native or purified coal composition as described in ASTM D3302/D3302M-17 Standard Test Method for Total Moisture in Coal.

The term "hydrocarbonaceous material" as used herein refers to a material containing hydrocarbons; hydrocarbons being an organic compound consisting substantially of the elements, hydrogen and carbon. Hydrocarbonaceous material may comprise aliphatic as well as aromatic hydrocarbons. Coal is a naturally hydrocarbonaceous material as opposed to activated carbon or graphite which typically comprise negligible hydrogen content, and are therefore referred to as "carbonaceous materials".

Bitumen, or asphalt, asphalt binder, or asphalt cement, is a highly viscous liquid pitch derived from the heavy-residues from crude oil distillation. Asphalt typically comprises a diverse mixture of organic molecules such as naphthene aromatics, polar aromatics, high molecular weight phenolics and carboxylic acids, saturated hydrocarbons and heterocyclic asphaltenes. Typical carbon content is in the range of 80 to 85 wt % with hydrogen content around 10 wt %. The balance is comprised of nitrogen, oxygen and sulfur, with trace amounts of metals such as iron, nickel and vanadium. The primary use of asphalt is as a binder substance when combined with stone or other mineral aggregate in the construction of paving for roads and metaled surfaces. As used herein the term "asphalt binder" is synonymous with asphalt/bitumen.

Asphalt pavement also referred to as "asphalt concrete" or as "bitumen macadam" typically comprises four major components: coarse aggregate, fine aggregate, mineral filler and asphalt binder. The proportions and properties of these four components may be varied to suit different applications dependent upon expected levels of wear, acoustic characteristics, and required durability. For example, mixtures made with the stiffer grades of asphalt and coarser aggregates are often used in the lower base layers of heavily trafficked roads, whereas optimized aggregate gradations and more engineered asphalts are typically preferred for surface courses. However, in general terms, just over half of an asphalt concrete mixture is made up of coarse aggregate (>2 mm particle size) with less than half as finer aggregate. The remainder of the mixture consists of small and almost equal percentages of mineral filler and binder, around 5% by weight of the mixture. Typically asphalt concretes are continuously-graded mixtures such that there is a proportion of every grade of aggregate mixed throughout the composition—gap graded mixtures are designed and used for more specific applications.

Asphalt emulsion is an emulsion where asphalt is dispersed in water and the emulsion is stabilised with a surface-active agent (surfactant) which is tailored to its intended use. The dispersed droplets may have a net electrical charge which can be positive, negative, or uncharged depending upon the surfactant employed.

In the UK and Europe, asphalt compositions are expected to meet empirical standards such as BS EN 13108 for asphalt concretes and BS EN 12591 for asphalt cement or bitumen, as well as BS EN 14023 for polymer modified bitumen. These standards present a menu of specification requirements from which individual specifications can be selected. Equivalent standards in the US may include, by way of example, ASTM D946, and D3381. However, in the US, the Superpave (SUperior PERforming Asphalt PAVEments) system was developed in the 1990s to give highway engineers and contractors the ability to design asphalt pavements that perform better under extremes of temperature and heavy traffic loads. The Superpave binder specification is a performance-based specification contrary to other specifications which are empirical in nature. It classifies asphalt binders into performance grades, based on a range of climates and pavement temperatures and adaptations take into consideration how to adjust for various traffic loads (AASHTO MP-1 and AASHTO MP-19) The physical properties required for the binder are the same for all grades, but the temperature at which those properties must be attained is determined by the specific climatic conditions at the paving location. The specification applies to all unmodified binders and many modified binders. Superpave binders are designated with a "PG" (performance grade) rating. The first number in the rating indicates the upper-temperature performance grade (UTPG) in degrees Celsius; the second is a negative number indicating the low-temperature grade (LTPG) in degrees Celsius. For example, a binder classified PG58-28 would meet the required physical properties at pavement temperatures as high as 58° C. and as low as −28° C. Hence, the mix designer will select a Superpave asphalt binder based on considerations such as the climate in which the pavement will serve and the type traffic it will bear. These specifications are presented under ASTM D 6373 or AASHTO M320, for example.

The present invention is based, in part, upon the identification of advantageous properties associated with purified coal product (PCP) when it used as an additive for the asphalt/bitumen or filler for the asphalt concrete compositions. These advantages may be utilized by mix designers to optimise asphalt binder for a range of paving and surfacing needs.

Demineralising and dewatering of coal fines to produce a PCP may be achieved via a combination of froth flotation separation, specifically designed for ultrafines and microfine particles, plus mechanical and thermal dewatering techniques. Typically, PCP may be produced from a feedstock of particulate coal via processes that comprise particle size reduction, mineral matter removal, dewatering and drying. Some or all of these steps may be altered or modified to suit the specification of the starting material or of the desired end product. The key process steps are summarised below in relation to a typical starting material derived from an impoundment, tailings pond or production tailings underflow.

Particle Size Reduction

The starting material is reduced to a particle size of d80=30-50 microns (or finer in some coals) to achieve efficient separation to a target mineral matter (ash) content of 5-8 wt %. To achieve this, a feed comprising the starting material is diluted with water to achieve a solids content of in the range 20-40 wt %, then ground in a ball or bead mill depending on the top size of the feedstock. The product is screened at a size range of approximately 100 microns to exclude particles above this size. A dispersant additive may be included to optimise energy use during size reduction (e.g. lignin-based dispersants, such as Borresperse, Ultrazine and Vanisperse manufactured by Borregaard, 1701 Sarpsborg, Norway). Suitable equipment for size reduction is manufactured by Metso Corporation, Fabianinkatu 9 A, PO Box 1220, FI-00130 Helsinki, FIN-00101, Finland; Glencore Technology Pty. Ltd., Level 10, 160 Ann St, Brisbane QLD 4000, Australia, and FLSmidth, Vigerslev Allé 77, 2500 Valby, Denmark.

Ash Removal

One or a series of froth flotation stages are carried out to bring the entrained mineral content down to the target level. For some coals where the mineral matter is disseminated mainly within sub-10-micron size domains, more than one stage of flotation following further milling may be required to achieve a low ash level.

During froth flotation a coal slurry is diluted further with water typically to a range of 5-20 wt % solids then collected in a tank and froth flotation agents, known as frother (e.g. methyl iso-butyl carbinol and pine oil) and collector (e.g. diesel fuel or other hydrocarbon oil, and Nasmin AP7 from Nasaco International Co., Petite Rue 3, 1304 Cossonay, Switzerland), are added using controlled dose rates. Micro particle separators (e.g. Flotation test machines manufactured by Eriez Manufacturing Co., 2200 Asbury Road, Erie, Pa. 16505, USA, by FLSmidth, Vigerslev Alle 77, 2500 Valby, Denmark, by Metso Corporation, Fabianinkatu 9 A, PO Box 1220, FI-00130 Helsinki, Finland, and GTEK Mineral Technologies Co. Ltd.) filled with process water and filtered air from an enclosed air compressor are used to sort hydrophobic carbon materials from hydrophilic mineral materials. Froth containing hydro-carbonaceous particles overflows the tank and this froth is collected in an open, top gutter. The mineral pulp is retained in the separation tank until discharged, whereas the demineralised coal slurry is de-aerated, before being subjected to additional processing.

Dewatering

The concentrate from froth flotation is dewatered with a filter-press or tube-press to a target range of 20-50 wt % depending on the actual particle size, under pressure or vacuum, sometimes with air-blowing, to remove water by mechanical means, in order to generate feed for the extruder. Suitable filter-press equipment is manufactured by Metso, FI-00130 Helsinki, Finland, FLSmidth, Valby, Denmark, and by Outotec. Rauhalanpuisto 9, 02230 Espoo, Finland.

In some instances, flocculant (or thickener, e.g. anionic polyacrylamide additive manufactured by Nalco Champion, 1 Ecolab Place, St. Paul, MN 55102-2233, USA) is added to optimise settling properties and underflow density. To optimise the procedure settling tests are carried out to measure settling rates and generate a settling curve, tracking underflow density with time.

Filtration may also be necessary depending on the filtration rate and resultant cake moisture. To optimise the procedure feed % solids (thickened/un-thickened), feed viscosity, pH and filtration pressure will be measured, Filter cloths are chosen after assessment of cake discharge and blinding performance. Suitable filter cloths are manufactured by Clear Edge Filtration, 11607 E 43rd Street North, Tulsa, Oklahoma 74116 USA.

In some circumstances a Decanter Centrifuge can be incorporated into the process design to concentrate the solids content prior to the filter press. Suitable equipment is manufactured by Alfa Laval Corporate AB, Rudeboksvägen 1, SE-226 55 Lund, Sweden.

Drying

The PCP product may be dried thermally to reduce water to below 5 wt %. This may be achieved directly on the PCP, or by pelleting it first to facilitate handling, by conveying it to a belt dryer where oxygen-deprived hot process air is blown directly over the microfine coal. Suitable equipment is manufactured by STELA Laxhuber GmbH, Öttingerstr. 2, D-84323 Massing, Germany or by GEA Group Aktiengesellschaft, Peter-Müller-Str. 12, 40468 Düsseldorf, Germany.

According to embodiments of the present invention, there is provided a process that blends either as a dry or wet mix the solid particulate matter of de-watered, demineralised microfine coal (PCP), suitably in a feedstock with an asphalt/bitumen, and optionally also with aggregate to form an asphalt concrete mixture. Suitably the PCP is utilized as an additive filler and also to impart desirable properties to an asphalt concrete, such as an improved upper temperature performance grade (UTPG), enhanced stiffness and/or increase resistance to deformation under heavy loads, slow traffic and/or at higher temperature climates. The amount of microfine PCP coal that may be blended with the asphalt/bitumen to form a combined binder composition is at least 0.1 wt % (zero point one weight percent), not less than 1 wt %, 5 wt %, 10 wt %, or 20 wt %; and/or not more than 50 wt %, 40 wt %, or 30 wt %. This allows for considerable economies of production, by replacing a significant proportion of asphalt/bitumen component with cheaper PCP material but without deleterious reductions in performance that might occur if a conventional mineral filler was used instead. The combined blend may also be introduced into existing mixing and pavement laying equipment as well as processes for laying of pavement, without extensive re-design of conventional equipment.

In specific embodiments, the invention provides for the blending or mixing of de-watered, demineralised microfine PCP, with asphalt/bitumen prior to subsequent combination with aggregate. The PCP-asphalt combined product represents a solid-liquid blended product that may be stored for future use.

According to further specific embodiments of the invention, at least about 90% by volume (% v) of the PCP particles are no greater than about 25 µm in diameter; optionally no greater than about 15 µm in diameter, optionally no greater than about 5 µm in diameter. Suitably, the PCP has an ash content of less than about 2 wt %, suitably less than about 1.5 wt %; optionally not more than 1 wt %. Optionally, the PCP has a water content of less than around 2 wt % and/or a sulfur content of less than around 2 wt %; optionally no greater than around 1 wt %, optionally no greater than 0.5 wt %.

The invention provides for methods for the manufacture of an asphalt concrete mixture, comprising combining an amount of PCP with an asphalt and subsequently with aggregate to produce a combined asphalt-PCP mix. The step of combining PCP with asphalt may be carried out at first temperature ($T_1$) of not less than 60° C., suitably not less than 80° C., typically not less than 100° C. and optionally around 120° C. The asphalt-PCP mix may be subjected to one or more blending stages. To further facilitate the mixing of the PCP asphalt/bitumen blend the temperature may be elevated further during mixing to a second temperature ($T_2$) that is greater than the first temperature (i.e. $T_2 > T_1$). The second temperature may be greater than 120° C., suitably above 150° C., optionally around 170° C. The homogenous mixture of PCP and asphalt may be cooled and stored or combined directly with aggregate and additional filler, if required, to form an asphalt concrete composition. Typical proportions of asphalt to aggregate/filler will vary depending upon the intended end use specifications or applications. Exemplary proportions include asphalt-PCP:aggregate of 2:98; 3:97; 4:96; 5:95; 6:94; 7:93; 8:92; and 10:90. Combination of asphalt-PCP with aggregate is suitably carried out at temperatures in excess of 100° C., suitably between 120° C. and 180° C., typically around 160° C.

To improve performance of asphalts, additives are often included, e.g. polyphosphoric acid (PPA) (Jaroszek, H., Polyphosphoric acid in road asphalt modification, CHEMIK 2012, 66, 12, 1340-1345, https://www.researchgate.net/publication/282990072_Polyphosphoric_acid_PPA_in_road_asphalts_modification, and Buncher, M., PPA modification and performance testing, The Asphalt Institute, http://asphaltmagazine.com/ppa-modification-and-performance-testing/#:~:text=The%20typical%20PPA%20dosage%20rate, use%20of%20other%20polymer%20modifiers.) and polymer modifying additives (Walker, D., The benefits of modified asphalts, The Asphalt Institute magazine, http://asphaltmagazine.com/the-benefits-of-modified-asphalts/).

PPA is included to improve stiffness at higher climatic temperatures or to effect so called 'grade bumping' which is where an additive is included in order to make a marginal asphalt meet specification. Modifiers, such as low density polyethylene and ethylene vinyl acetate, elastomers (e.g. crumb rubber) chemical modifiers, extenders, oxidants and antioxidants, hydrocarbons and anti-stripping additives are often included especially to improve fatigue, thermal cracking resistance, and moisture damage. Additives which promote adhesion between the asphalt and the rock aggregate interface in the presence of moisture are known as anti-stripping agents. These are often dependent on base chemistry and are required in some US states to reduce moisture damage.

In one embodiment of the invention, the PCP is used as a UTPG booster additive for asphalt/bitumen blends. In this embodiment, the asphalt/bitumen blend may be utilized for a concrete mixture may comprise an asphalt/bitumen base, coarse and fine aggregate and a primary filler, wherein the PCP is included as a minority component in a sufficient quantity to cause an increase in the UTPG. Suitably the amount of PCP included as a UTPG booster additive may range from at least 0.1 wt %, 1.0 wt %, 5 wt % and 10 wt %, to at most 50 wt %, 30 wt %, typically less than 25 wt % of the total composition. Accordingly, the PCP may increase UTPG by at least 2° C., generally by 5° C., generally by 8° C., suitably by 10° C. and most typically by 18° C., but not by more than 50° C.

The compositions of the present invention may contain other materials such as fillers including carbon black, calcium carbonate, limestone, hydrated lime, steel slag, fly ash, chalk, or ground rubber tires (e.g. crumb rubber). Other materials which may be incorporated in these compositions generally in the liquid asphalt itself, include unsaturated block copolymers like styrene-butadiene-stirene (SBS), SEBS, and stirene-isoprene-stirene (SIS) block copolymers; SBR and plastomers such as low-density polyethylene (LDPE) and ethylene-vinyl acetate (EVA), ethylene-butyl acrylate (EBA), polypropylene including atactic polypropylene. If other materials are added such as Fisher Tropsch paraffins, gilsonite, or polyphosphoric acid, the relative amounts of the asphalt/bitumen-PCP specified herein remain the same.

In another embodiment of the invention PCP is used as a stabilizer and an extender for asphalt emulsions. Asphalt emulsions are water-continuous dispersions of fine asphalt droplets, typically 1-10 μm in diameter, which is the same size as PCP particles. Previous inventions relating to the stabilization of mixtures containing hydrocarbonaceous solids, oil and water utilize much coarser sized coal (typically 200 μm in diameter and require the addition of a thickener such as an aluminate, silicate, aluminosilicate or a combination of these compounds (e.g. U.S. Pat. No. 4,670,019A).

PCP exhibits surfactant properties for the emulsions utilizing the high available surface area of the PCP particles and its molecular structure within. Although PCP can stabilize an asphalt emulsion its main value is providing a recyclable alternative, in part, for asphalt itself in such emulsions. PCP also stabilizes asphalt emulsions containing mineral fillers, such as clay as in seal coat. The use of PCP as wetcake, i.e. wet filter-cake, or as a slurry, directly in this application not only provides a lower energy option as the water does not need to be evaporated, but also reduces the total amount of fresh water required to manufacture such emulsions.

The invention is further illustrated by the following non-limiting examples.

EXAMPLES

Example 1: Comparison of Asphalt-PCP Blends with Medium-Hard Asphalt Blends Containing an Inert Filler (i.e. Limestone)

Materials and Testing Methods

A Medium-Hard Asphalt (BI-0002, residue from North Slopes and Mid Valley California crudes) was heated to 120° C., mixed by hand and added to a metal can containing a pre weighted amount of limestone (3.5 micron average size, Vicron 15-15 from Minerals Technologies Inc.). The amount of asphalt (100 $g_{asphalt}-\times g_{limestone}$) was added to make 100 g blends of 10% (10 g), 20% (20 g) and 30% (30 g) limestone as a relatively inert control material. The samples were maintained around 120° C. and gently stirred by hand to incorporate the limestone. The samples were then heated to 170° C. using an oil bath and blended with a high shear mixer for 60 minutes under a gentle flow of nitrogen. PCP derived from a US source bituminous coal was blended with asphalt BI-0002 at 5, 20 and 35 wt % under a similar protocol to that described for limestone.

It should be noted that limestone has a density of approximately double that of PCP.

According to Superpave specifications (American Association of State Highway and Transportation Officials AASHTO MP-1, Standard Specification for Performance Graded Asphalt Binder), the Performance Grade (PG), of the asphalt/bitumen consists of two numbers in degrees Celsius: for example a common PG grade is 64-22. The first number is the upper temperature which satisfies criteria for the surface temperature and traffic load that the asphalt will be applied as a pavement—as the upper temperature PG (UTPG) goes up for stiffer asphalt/bitumen. This temperature is determined by measuring properties (stiffness modulus and phase angle) at different temperatures and a given frequency with 25 mm parallel plates in a dynamic shear rheometer (DSR) on the unaged asphalt.

When asphalt is used in paving applications it is heated to temperatures around 160-180° C. and blended with dry hot rock aggregate (5:95 asphalt:aggregate in weight %) and then applied as a loose mix (asphalt concrete) with significant compaction (105-145° C.) to achieve a pavement mat. To simulate the oxidation which takes place in the thin asphalt mastic film under these mixing and laying conditions the unaged asphalt is subjected to rolling thin film oven (RTFO, also referred to short-term aging) aging test according to standard methods, such as AASHTO T 240, Standard Specification for Effect of Heat and Air on a Moving Film of Asphalt (Rolling Thin Film Oven Test). According to Superpave specification, the RTFO aged material should also be tested by DSR using a different set of criteria to evaluate the UTPG. The DSR values from the unaged and RTFO asphalt are then compared and whichever is lower is used as the UTPG. It should be noted that the Superpave system divides grades of asphalts into 6° C. increments, but in these examples the exact, or continuous, PG is used.

In the Superpave PG schema, the second number (64-22) is a negative number in ° C. which takes into account the cold surface temperature for the climate in a given geographical area where the pavement will be applied and ensure thermal cracking resistance of the binder. Asphalts in warmer climates, like southern states of the USA (e.g. Texas) or the Middle East, require a higher UTPG and can tolerate higher lower temperature PG (LTPG); whereas, colder climates, like northern USA, northern Europe or Canada, require asphalts with a much lower LTPG to prevent thermal cracking but can also tolerate a lower UTPG, depending on the application. The low temperature PG has been determined using 4 mm parallel plates in a DSR and measuring values over a range of isotherms for the asphalt after laboratory aging. The values which are measured are a stiffness (S), the rate of relaxation (m-value), and the critical temperatures at which they reach defined Superpave criteria; whichever of these critical temperature values is higher is used for the LTPG (Four-mm Dynamic Shear Rheometry, US Federal Highway Administration Tech Brief FHWA-HRT-15-053). The laboratory aging which is used prior to measuring these properties is a combination of RTFO followed by pressure aging vessel (PAV) according to specifications such as in AASHTO R 28. PAV aging, is often referred to as long-term aging, and was intended to simulate oxidative aging in pavement after 5 years—it has been since discovered that it simulates between 2 and 4 years Another component to Superpave specifications is related to the workability of the asphalt. To gauge workability, or the ability to easily pump and handle the hot asphalt during paving, the viscosity is measured using a rotation viscometer at 135° C. It is desired that the viscosity be below 3 Pa·s under these conditions.

Test results for asphalt-PCP and asphalt-limestone blends

Unaged limestone blends and RTFO blend properties were measured by DSR according to Superpave specifications and the UTPG determined, these values are provided in Table 1.

TABLE 1

Unaged and RTFO continuous UTPG for Medium-Hard Asphalt blends

| | Sample | Unaged UTPG (1.0 kPa) | RTFO UTPG (2.2 kPa) | Wt % Solids | UTPG |
|---|---|---|---|---|---|
| PCP mix | BI-0002 + 0% PCP | 70.3 | 69.2 | 0 | 69.2 |
| | BI-0002 + 5% PCP | 73.5 | 71.9 | 5 | 71.9 |
| | BI-0002 + 20% PCP | 78.0 | 74.9 | 20 | 74.9 |
| | BI-0002 + 35% PCP | 82.1 | 79.8 | 35 | 79.8 |
| Limestone (3.5 microns) | BI-0002 + 10% Limestone | 70.8 | 70.4 | 10 | 70.4 |
| | BI-0002 + 20% Limestone | 72.0 | 71.4 | 20 | 71.4 |
| | BI-0002 + 30% Limestone | 73.4 | 75.0 | 30 | 73.4 |

There is a positive correlation between the UTPG and the amount of solids blended into the asphalt, as shown in FIG. 1. For the unaged blends, the UTPG for PCP mixes increased at a much greater rate (steeper slope) relative to limestone. The difference in the slopes between PCP and limestone for the RTFO aged materials are less, but still significant. In both PGs, PCP increases UTPG more significantly than limestone.

Figure 2:
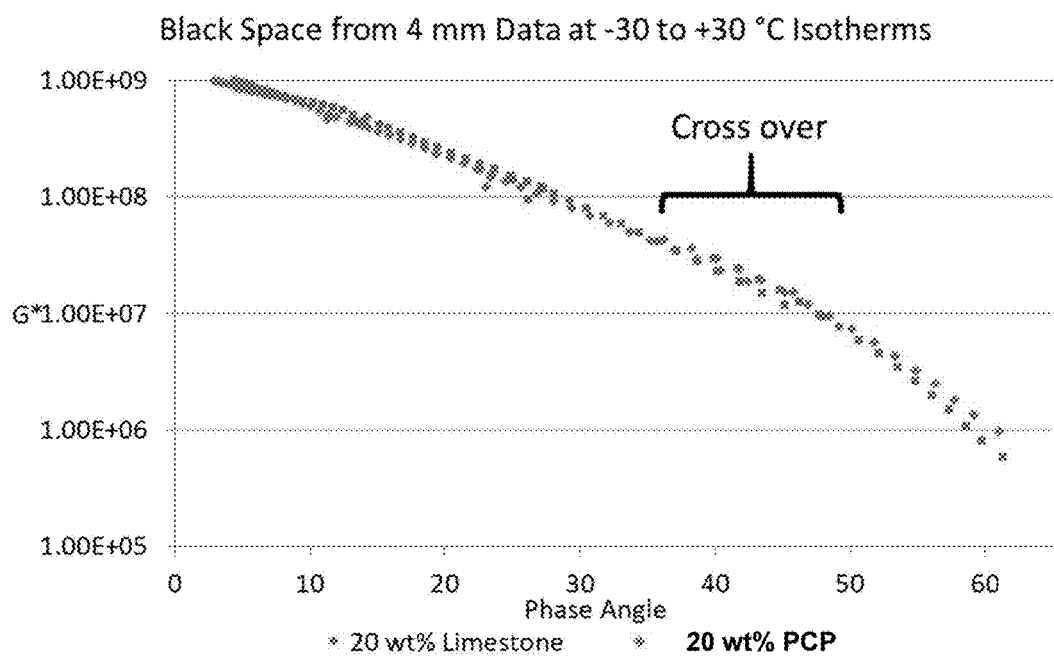
FIG. 2 is a Black space diagram which plots the log of the complex modulus |G*| versus the phase angle for raw data, which is collected by a 4 mm dynamic shear rheometer (DSR) for different frequencies for isotherms at −30, −15, 0, 15, and 30° C. A region of cross over is indicated showing that the behavior of PCP additive in asphalt is different than limestone.

This is verified by the Black space diagram which plots the log of the complex modulus |G*| versus the phase angle for raw data for the 4 mm DSR raw data collected for both PCP and Limestone at 20 wt % and shown in FIG. 2. A region of cross over is indicated showing that the behavior of PCP additive in asphalt is different than limestone. At higher temperature isotherms (i.e. in the higher phase angle region) it is worthy to note that the PCP containing asphalt is stiffer (larger complex modulus, G*) than that containing limestone. This indicates greater ability of PCP-containing asphalt to reduce deformation (rutting) when used as asphalt concrete than for limestone-containing asphalt.

A number of common additives are used in the paving industry to increase the UTPG by a few degrees to bring an asphalt that is slightly off specification into a desired specification, or to bump its grade as described previously. This practice of increasing the UTPG by a few degrees is known as 'PG boosting', and the most common additive used for this purpose is polyphosphoric acid (PPA). PPA has excellent properties because it increases the UTPG with little or no detriment to the LTPG. However, PPA requires special handling as it is corrosive to mild and carbon steel. PPA has also been banned in some states in the US due to unfavorable interactions with basic additives (e.g. hydrated lime and amine based products) which are added to reduce moisture damage. Additives which promote adhesion between the asphalt and the rock aggregate interface in the presence of moisture are known as anti-stripping agents. These are often dependent on basic chemistry and are required in some US states to reduce moisture damage (i.e. stripping). Hydrated lime (calcium hydroxide) is also a common filler used in the pavement mixture design for several US state Department of Transportation (DOT) agencies. PPA can also induce $H_2S$ generation by deactivation of metal scavengers added to control $H_2S$), particularly when combined with sulfur cross-linked PMA's (Baker Hughes Case Study, SULFIX scavenger ensured safe production of PPA asphalt by mitigating $H_2S$ regeneration, https://www.bakerhughes.com/case-study/sulfix-scavenger-ensured-safe-production-ppa-asphalt-mitigating-h2s-regeneration). In contrast PCP, due to its hydrocarbonaceous origins and absence of acidic groups in its irregular aromatic/aliphatic polymeric structure, does not have any such negative interactions.

The relatively high surface area of PCP (22 $m^2/g$) offers potential to impart other benefits to asphalt mixes, e.g.

By adsorbing odor and volatile hydrocarbon emissions during use,

By acting as a stabilising agent for Pickering emulsions for cold mix, and chip seals and other surface treatments (ZhongQiu Chen & Zhigang Li, Preparation and stabilisation mechanism of asphalt-in-water Pickering emulsion stabilised by SiO2 nanoparticles, Road Materials and Pavement Design, 22:7, 1679-1691, 2021, https://doi.org/10.1080/14680629.2019.1708431).

Here the presence of both hydrophilic (e.g. aromatic and aliphatic OH groups) and hydrophobic (e.g. fused aromatic structures, aliphatic bridges between aromatic structures) sites is important.

Any promising upper temperature PG-boosting effect must be checked against the response at lower temperatures by monitoring the LTPG. This is because most additives that increase the UTPG also raise the LTPG. To generate an optimal asphalt product, UTPG enhancing additives should have negligible effect on the LTPG properties. It is often the case that products which can increase the UTPG also increase the LTPG so that the LTPG falls out of specification. LTPG properties—measured by 4 mm DSR—are shown in Table 2.

TABLE 2

Continuous LTPG, stiffness (S) critical temperature, rate of relaxation (m-value) critical temperature, ΔTc (S − m-value).

| | USAT RTFO/20 hr PAV, 4 mm DSR | Wt % solids | Tc(m-value) | Tc(S) | ΔTc | UTPG | LTPG |
|---|---|---|---|---|---|---|---|
| PCP | BI-0002 + 0% PCP | 0 | −8.7 | −10.5 | −1.8 | 69.2 | −18.7 |
| | BI-0002 + 5% PCP | 5 | −6.9 | −9.3 | −2.4 | 71.9 | −16.9 |
| | BI-0002 + 20% PCP | 20 | −5.0 | −6.9 | −1.9 | 74.9 | −15.0 |
| | BI-0002 + 35% PCP | 30 | −4.9 | −6.3 | −1.4 | 79.8 | −14.9 |

TABLE 2-continued

Continuous LTPG, stiffness (S) critical temperature, rate of relaxation (m-value) critical temperature, ΔTc (S − m-value).

| USAT RTFO/20 hr PAV, 4 mm DSR | | Wt % solids | Tc(m-value) | Tc(S) | ΔTc | UTPG | LTPG |
|---|---|---|---|---|---|---|---|
| Limestone (3.5 μm) | 5 BI-0002 + 10% Limestone | 10 | −8.5 | −9.4 | −0.9 | 70.4 | −18.5 |
| | BI-0002 + 20% Limestone | 20 | −8.8 | −9.3 | −0.5 | 71.4 | −18.8 |
| | BI-0002 + 30% Limestone | 30 | −8.0 | −6.5 | 1.5 | 73.4 | −16.5 |

Figure 3:
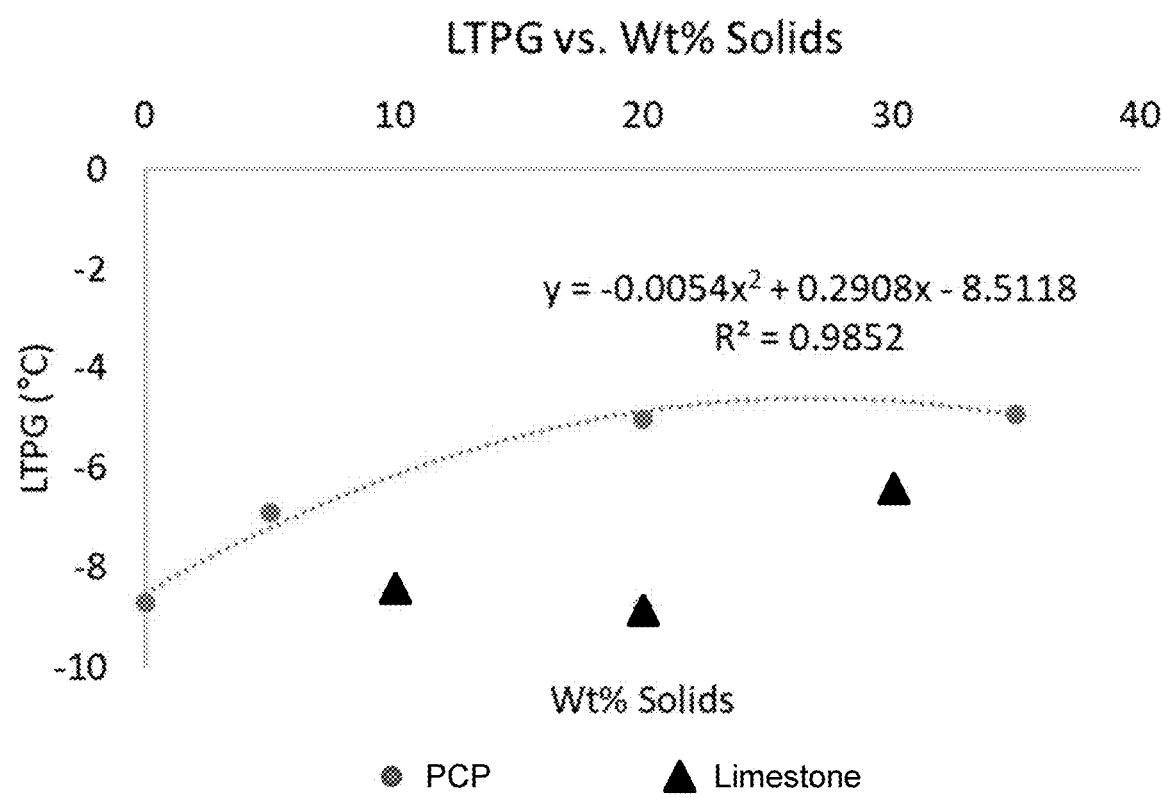
FIG. 3 is a graph that shows the relationship between the lower temperature performance grade (LTPG) and the amount of solids comprised within an asphalt mixture in wt %.

By plotting the LTPG properties, relative to the weight percent of solids, PCP increases the LTPG modestly, but then levels off, as shown in FIG. 3. The results show that the LTPG increases by less than half of the gain in the UTPG. This means that the LTPG is less affected than the UTPG, when using PCP as an additive which represents a real benefit. In the case of limestone, the LTPG decreases from 10 to 20 wt % but then increases for 30 wt %. The increase at 30 wt % limestone is likely due an increased stiffness occurring from particle-particle interactions, which is well documented to occur around 30% of filler in asphalt. In any case, PCP increases the LTPG slightly and does not have any adverse effect on the ΔTc value (more negative means more prone to cracking, see Table 2). This means that PCP additive presents a very low risk for promoting cracking in asphalt pavement.

Figure 4:
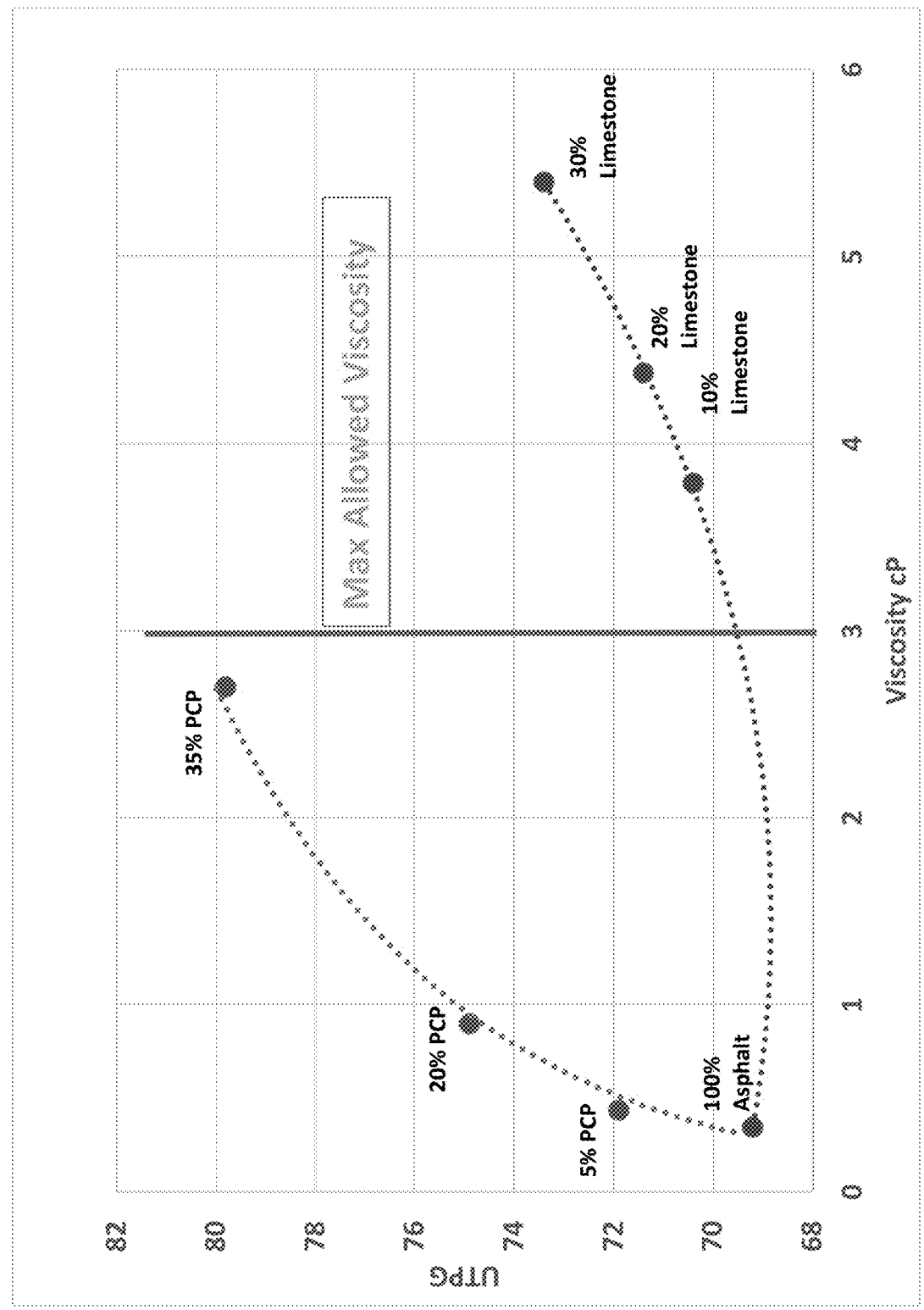
FIG. 4 is a graph that shows the upper temperature performance grade (UTPG) and the rotational viscosity for limestone filler (lower line) and PCP blended (upper line) at different concentrations. The limit for the Superpave specifications is also shown at 3 Pa·s.

An important aspect of asphalt paving relates to the practical handling of asphalt in current mix plant and paving equipment. This is determined by the rotational viscometer specification for pumpability, mixability and workability of asphalt, which in order to meet Superpave standards should be <3 Pa·s when measured at 135° C. FIG. 4 shows that PCP (upper line) increases the viscosity of an asphalt blend to a lesser extent as compared to limestone filler (lower line). It is surprising that PCP can significantly improve UTPG, yet remain within viscosity specifications, even at a high concentration of 35 wt % PCP. In contrast, the use of limestone as an additive, even at 10 wt % fails to meet this viscosity requirement, nor does it increase UTPG as effectively as PCP. Under all the concentrations evaluated, limestone produces a much higher viscosity that is outside of the specification range. However, PCP is within specification limits for all concentrations tested.

Example 2: Comparison of Asphalt-PCP Blends with Medium-Soft and Medium Asphalt Blends As described in example 1, PCP derived from a US source bituminous coal was blended at 10 wt % with a Medium-Soft Asphalt manufactured in a US Gulf Coast refinery (sample GC) and a Medium softening Asphalt manufactured in a US West Coast refinery (sample WC). Unaged blends and RTFO blend properties were measured as before by DSR according to Superpave specifications and the UTPG determined, these values are provided in Table 3.

TABLE 3

Unaged and RTFO continuous UTPG for Medium and Medium-Soft Asphalt blends with PCP

| | Upper Temperature PG | |
|---|---|---|
| | Unaged | RTFO |
| | ° C. | |
| 100% Asphalt WC | 61.2 | 67.5 |
| 90% WC 10% PCP | 67.2 | 75.2 |

TABLE 3-continued

Unaged and RTFO continuous UTPG for Medium and Medium-Soft Asphalt blends with PCP

| | Upper Temperature PG | |
|---|---|---|
| | Unaged | RTFO |
| | ° C. | |
| 100% Asphalt GC | 55.3 | 54.0 |
| 90% GC 10% PCP | 61.3 | 60.1 |

For both Asphalt grades a significant increase in the Upper PG value, whether unaged or aged, was obtained when 10% PCP was added:
For WC Asphalt Unaged UTPG was increased by 6° C. and under RTFO conditions increased 7.7° C.;
For GC Asphalt Unaged UTPG was also increased by 6° C. and under RTFO conditions increased 6.1° C.

Example 3: Comparison of an Asphalt-PCP Blend with Asphalt-PPA Blends

PPA, which is widely used at low concentrations as a PG booster for asphalts, was discussed in Example 1. Here, as described in example 1, PCP derived from a US source bituminous coal was blended at 10 wt % with a Medium Asphalt manufactured in a US West Coast refinery (sample WC). Similarly, Polyphosphoric acid (PPA, grade 105%) was blended with WC at 0.5 wt % and 1.0 wt %. Unaged blends and RTFO blend properties were measured as before by DSR according to Superpave specifications and the upper and lower temperature performance grades determined, these values are provided in Table 4.

TABLE 4

UTPG and LTPG properties for Medium-Asphalt blends with PCP and separately with Polyphosphoric acid (PPA)

| | Upper Temperature PG | | Lower Temperature PG | | | |
|---|---|---|---|---|---|---|
| | | | Stiffness | m-value | ΔTc (Tc(S) − Tc(m)) | |
| | Unaged | RTFO | Tc(S) ° C. | Tc(m) | | PG |
| 100% Asphalt WC | 61.2 | 67.5 | −22.9 | −20.6 | −2.3 | 58-28* |
| 90% WC 10% PCP | 67.2 | 75.2 | −21.5 | −19.6 | −2.2 | 64-28* |
| WC + 0.5% PPA | 72.9 | 73.5 | −23.1 | −20.9 | −2.2 | 70-28* |
| WC + 1.0% PPA | 77.4 | 77.8 | −18.3 | −24.0 | −4.3 | 76-28* |

Note:
*When calculating the low temp PG 10° C. must be subtracted from either the Tc(S) or Tc(m) whichever is higher, so −20.6° C. becomes −30.6° C. giving a standard PG of −28

The results in Table 4 show that:
Both PPA and PCP increase both unaged and RTFO UTPG values. Thus, both additives are effective UTPG boosters.
Both 10% PCP and 0.5% PPA addition have a similar limited impact on LTPG, compare m-values of −19.6° C., −20.9° C. respectively with −20.6° C. for the unadditivated Asphalt WC. As a result, the lower standard PG for all three modified blends is unaltered.
Although 1.0% PPA addition increases unaged and aged (RTFO) UTPG further to 77.4° C. and 77.8° C. respectively), at this level when blended with Asphalt WC, PPA negatively impacts low temperature properties. A significantly larger negative value for the cracking parameter, ΔTc, is observed which indicates poorer relaxation properties that can contribute to non-load related cracking or other age-related embrittlement distresses in an asphalt pavement. (https://www.fhwa.dot.gov/pavement/asphalt/HIF_Delta_Binder_Spec_TchBrf.pdf). For the 10% PCP-WC Asphalt blend, ΔTc, actually improves slightly.

Example 4: Storage of an Asphalt-PCP Blend

The effect of storage at 150° C. for 48 hours on Upper Temperature Performance grade properties was investigated for Asphalt WC and a blend of 10% PCP with Asphalt WC, Table 5. Here, samples from the top and bottom of the storage container were analyzed by DSR according to ASTM D7175, Standard Test Method for Determining the Rheological Properties of Asphalt Binder Using a Dynamic Shear Rheometer and the differences expressed as percentages. ASTM D7175 defines the acceptable repeatability range for a single operator as 6.4%.

TABLE 5

Upper Temperature Performance grade properties after storage at 150° C. for 48 hours

| Sample | | G* Shear modulus (complex component) | | Phase angle | | UTPG | |
|---|---|---|---|---|---|---|---|
| | | Pa | Difference % | °(degrees) | Difference % | Value ° C. | Difference % |
| 100% Asphalt WC | Bottom | 2010 | 0.4 | 86.12 | 0.1 | 63.3 | 0.0 |
| | Top | 2018 | | 86.05 | | 63.3 | |
| 90% WC 10% PCP | Bottom | 3614 | 0.5 | 83.79 | 0.1 | 68.5 | 2.2 |
| | Top | 3633 | | 83.73 | | 70.0 | |

The results in Table 5 show that the differences between bottom and top samples for Phase angle and shear modulus (G*) are very small and effectively the same for the 10% PCP blend as for the 100% Asphalt WC. The 2.2% difference between top and bottom measured for UTPG is well within the repeatability range of 6.4% and hence is not significant.

Thus, no change in the key properties of the 10% PCP/Asphalt blend were observed from storage at 150° C. for 48 hours.

Example 5: Preparation of Asphalt Emulsions

Background:
Asphalt emulsion is an emulsion where asphalt is dispersed in water and the emulsion is stabilised with a surface-active agent, suitably a surfactant, which is tailored to its intended use. The dispersed droplets may have a net electrical charge which can be positive, negative, or uncharged depending upon the surfactant employed. Asphalt emulsions can also contain other agents including, but not limited to, polymers, solvents and rejuvenators. In certain instances asphalt emulsions may further comprise an amount of coal tar.

The presence of a surface-active agent holds the asphalt droplets in suspension when in an aqueous medium. Conventionally, surfactant systems may be cationic, anionic or non-ionic. Surfactants in all systems can be derived from long-chain fatty acids and, where appropriate, their salts. The fatty acids can be derivatives of naturally occurring oils and fats, or they can be of synthetic origin. According to specific embodiments, the fatty acids used in cationic surfactants can be amidoamines, imidazolines, fatty amines, fatty diamines, fatty quaternary ammonium compounds or ethoxylated derivatives. Suitable cationic surfactants include e.g. ACRA 880LV and ARRTEKK® products by Arkema, Mulberry, FL 33860, USA and TEGO® ADDIBIT additives by Evonik Corporation, Richmond, VA 23234, USA. Hence, the cationic surfactant molecules that surround an asphalt particle/droplet can impart a positive charge to the surface of the asphalt particle/droplet. In contrast, surfactants in anionic asphalt emulsions can be wood or paper-processing derivatives such as hydoxystearic acid, lignin sulfonates, rosin acids or tall oil fatty acids. In other embodiments, the anionic surfactant fatty acids can be petroleum sulfonates such as alphaolefin sulfonates. Suitable anionic surfactants include ARRMULS® products by Arkema, Mulberry, FL 33860, USA and Alkyl Sulphonates, Alkyl Sulphates and Alkyl Phosphate Esters by Lankem Ltd., Dukinfield, Cheshire, UK. In still other embodiments, the fatty acids can be from lauric, linoleic, myristic, palmitic, oleic or ricinoleic acids. In some embodiments, the surfactant may be generated by a saponification reaction of a base and fatty acid. The base can be potassium or sodium hydroxide (KOH or NaOH). Hence, the anionic surfactant molecules that surround an asphalt particle can impart a negative charge to the surface of the asphalt particle/droplet. Finally, nonionic asphalt emulsions can be derived from neutrally charged long-chain fatty acids. In some embodiments, the surfactant in nonionic asphalt emulsions can include long chain polyoxyethylene or polyoxypropylene groups in fatty acid, alcohol, amide or amine molecules. These surfactants can be hydrophilic due to oxygenated side chains—i.e., polyoxyethylene or polyoxypropylene chains combined with the oil-soluble fatty acid, alcohol amine or amide component of the molecule. Suitable non-ionic surfactants include alcohol ethoxylates, oleic acid ethoxylates and sorbitan ester ethoxylates by Lankem Ltd., Dukinfield, Cheshire, UK and Tween-polysorbates and Sorbitan oleates by IRO Surfactant Co.

Ltd., Qingdao, China. It is contemplated that in embodiments of the invention, surfactants from cationic, non-ionic and anionic systems may be used.

Approximately 10% of all asphalt usage is in the form of asphalt-in-water emulsions. The major part is used as a protective layer, typically in spray applications, and referred to as a seal coat. The rest is used in asphalt mixtures prepared cold or warm. An important application in some countries is micro-surfacing, in which a mix of polymer-modified asphalt emulsion, fine grained aggregate, water, and cement is applied to the surface of an asphalt or cement concrete roadway from a mobile mix paver to correct deformations, improve skid resistance, and seal the surface. Some examples of types of seal coats are: fog seals, a diluted asphalt emulsion used to renew old asphalt surfaces, seal small cracks and surface voids; sandwich seals, a surface treatment consisting of the application of a large aggregate, then a spray applied asphalt emulsion, and covered with a smaller aggregate; and slurry seals, a mixture of emulsified asphalt, well-graded fine aggregate, mineral filler or other additives, and water which fills minor cracks, restores a uniform surface texture, and restores friction values. Seal coat provides a layer of protection from asphalt-damaging agents such as UV rays, oils, pollutants, and water.

Asphalt emulsions are water-continuous dispersions of fine asphalt droplets, typically 1-10 μm in diameter, manufactured with the aid of a colloid mill. The emulsions may contain between 40% and 80% asphalt by weight. The emulsions have significantly lower viscosity than asphalt itself, and so can be applied at lower temperatures. Consequently, processes using emulsions have lower energy consumption and lower emissions than those using hot asphalt or cutbacks, asphalt solutions in hydrocarbon solvents. (Takamura, K. & James, A, Paving with asphalt emulsions, Advances in Asphalt Materials, Road and Pavement Construction, Woodhead Publishing Series in Civil and Structural Engineering, pp. 393-426, 2015 (https://doi.org/10.1016/6978-0-08-100269-8.00013-1).

Penetration value is a measure of hardness or consistency of an asphalt and is the vertical distance traversed or penetrated by the point of a standard needle into the asphalt under specific conditions of load, time and temperature—see ASTM D946-09. According to embodiments of the invention harder asphalt grades of 80/100 may be used as well as softer grades of 150/200.

Seal coat is a thin liquid layer applied to the surface of worn or freshly installed asphalt for the purpose of protecting the asphalt, extending its life, and enhancing its aesthetic appeal by providing a layer of protection from asphalt-damaging agents such as UV rays, oils, pollutants, and water. Seal coat typically consists of refined coal tar and/or asphalt with water, emulsifying agents (e.g. surface-active agents such as a surfactant) and fillers (e.g. mineral fillers including clay, sand, lime, fly ash or slag).

In the experiments that follow the PCP is shown to act as an affective stabilizer of asphalt emulsions and may even be used as a surface-active agent in the absence of surfactant.
Experiments:
(i) With PCP, Soap Surfactant and Sodium Hydroxide (Tests 1-4)

PCP as wetcake (PCP containing up to around 55% m water), tap water and a small amount of surfactant and sodium hydroxide were blended in a bench-top Waring blender at high speed. A standard dishwashing liquid soap was used as emulsifier for asphalt emulsions; Dawn™ dishwashing soap was used in the first three tests. Note that the active ingredients in Dawn™ are diluted over 10 times with water. Sodium hydroxide raises the pH and prevents sticking of the asphalt to the equipment.

Liquid asphalt (prepared at ca. 150° C.) was added in a thin stream to the rapidly mixing aqueous suspension when the asphalt stream was torn apart into tiny droplets. After mixing in the blender for several minutes, the liquid was transferred to the bench-top rotor/stator mixer and the emulsification was continued. Smooth oil-in-water cationic emulsions were formed for three different formulations, Tests 1, 2 and 3, see Table 6.

The first test (Test 1) contained just 9% m asphalt. By adding slightly more PCP and surfactant, another successful emulsion was made containing 20% m asphalt (Test 2).

TABLE 6

Formulations used to prepare oil-in-water cationic emulsions from asphalt and PCP wetcake

| Test no. | Asphalt | PCP dry | Water % m | NaOH | Soap | PCP/(Asphalt + PCP) |
|---|---|---|---|---|---|---|
| 1 | 9 | 10 | 80 | 0.21 | 0.105 | 0.53 |
| 2 | 20 | 15 | 65 | 0.15 | 0.150 | 0.43 |
| 3 | 43 | 7 | 50 | 0.13 | 0.195 | 0.14 |
| 4 | 38 | 12 | 50 | 0.12 | 0 | 0.24 |
| 5 | 48 | 10 | 42 | 0.2 | 0 | 0.17 |
| 6 | 52 | 9 | 39 | 0.9 | 0 | 0.15 |
| 7 | 45 | 14 | 41 | 0.3 | 0 | 0.24 |

| | Asphalt | PCP dry | Water % m | Clay | Surfactant (ACRA 880LV) | |
|---|---|---|---|---|---|---|
| 8 | 31.5 | 5.6 | 45 | 18 | 1.0 | 0.15 |
| 9 | 29.8 | 5.3 | 47 | 17 | 0.5 | 0.15 |

* including water derived from PCP wetcake

The ratio of PCP/(Asphalt+PCP) is provided to show the proportion of PCP in the emulsion as a proportion of total hydrocarbon content. The ratio is provided on a dry weight basis. In instances where an emulsion may also contain coal tar, the ratio may further contain coal tar.

By adding even more PCP and surfactant, the asphalt level could be increased to more than 40%. This resulted in an asphalt foam being produced. Such a foam enables excellent dispersion of the asphalt among the PCP particles. Upon settling for several hours, the foam resolves into an oil-in-water liquid asphalt emulsion as the air escapes.

In Tests 1-3 asphalt droplets became surrounded by PCP micro-particles of approximately the same size becoming stabilized in the aqueous continuous phase. After 24 hours, there was some separation of solids from the emulsions, but these could be easily stirred back into suspension.

Tests 1 and 2 had the highest percentages, 53% m and 43% m of PCP within the hydrocarbon blend (PCP+asphalt) in these tests. Tests 4-7 contained lower percentages of PCP within the hydrocarbon blend (PCP+asphalt) within the range 14-24%.

To remove foaming, and to increase long term stability, the PCP/asphalt ratio was doubled from 0.16 to 0.31, and the surfactant was omitted, Test 4. The result was a smooth water-thin black emulsion. After 24 hours, there was minimal settling of solids, and the suspension remained homogeneous. The viscosity of this emulsion was less than 10 cP.

Figure 5:
FIG. 5 shows photographs of the physical appearance of asphalt-PCP emulsions from (a) Test 1 (b) Test 2 (c) Test 3 (d) Test 4 and asphalt-PCP-clay emulsions from (e) Test 5 and (f) Test 6.

The physical appearance of asphalt-PCP emulsions from Tests 1-4, see FIG. 5, shows a clear transition from uniform emulsions with large air bubbles, Tests 1 and 2, FIGS. 5(*a*)

and 5(b), to a uniform foam, Test 3, FIG. 5(c), to a homogeneous emulsion, Test 4, FIG. 5(d).

Surprisingly Test 4 (FIG. 5(d)) yields the most stable emulsion with the mechanism changing from surfactant-assisted emulsification to a solely solid-stabilized emulsion. Without wishing to be bound by theory, it is thought that the surfaces of PCP particles are acting as an emulsifier in lieu of a surfactant.

The emulsion from tests 5-7 also contained no surfactant and varied in viscosity:

Test 5 had the lowest viscosity of these three formulations, nevertheless was stable;

Test 6 had the highest viscosity of these three formulations, the highest dosage but the lowest PCP/(PCP+Asphalt) ratio.

When a few drops of soap solution was mixed in by hand to an aliquot of this emulsion after blending was completed, the emulsion became "lumpy" and less stable. When a little more PCP wet cake was added to an aliquot of this lumpy emulsion, the mixture became smooth and the emulsion recovered. Hence PCP actually helps to stabilize the emulsion.

Test 7 had mid-range viscosity and was pourable. The stability of asphalt-PCP emulsions is improved by using a colloid mill or other very high shear mixing device which ensures the asphalt particles are predominantly within the 1-10 micron size range.

(ii) With PCP, Surfactant and Clay (Tests 8 and 9) as in Seal Coat

PCP wet cake was dried to a free-flowing powder, and then combined (15% m) with asphalt (85% m) from US Gulf Coast with a 150/200 Penetration Index according to ASTM D946-09. The addition of PCP to a such a low-grade asphalt makes it stiffer and increases the higher temperature performance grade. The blend was initially mixed by hand initially incorporate powder into oil and was then homogenized using a stirred ball mill (Union Process Inc., Akron, OH, USA).

The surfactant used in Tests 5 and 6, ACRA 880LV, is designed to produce clay-stabilized emulsions for pavement sealer applications conforming to typical specifications, including ASTM D5727: Standard Specification for Emulsified Refined Coal Tar (Mineral Colloid Type), ASTM D6946: Standard Specification for Emulsified Refined Coal Tar (Driveway Sealer, Ready to Use, Residential Grade) and FAA Specifications P-630 and P-631 for Coal Tar Emulsions.

In Test 8 kaolin clay, water and surfactant were blended using a Silverson mixer with 6 mm stator holes in a mixing vessel to improve flow of more viscous materials. While the clay and water blend had a relatively low viscosity, the addition of the surfactant made the blend much stiffer. Molten PCP/Asphalt mix was slowly poured into the stirring clay suspension, resembling a thick batter. A successful oil in water emulsion resulted, FIG. 5(e).

For Test 9 only half the ACRA surfactant was included, and the clay loading was reduced slightly from 18% m to 17% m. The blend of clay, water and surfactant was still fluid. Molten PCP/Asphalt was added to the aqueous phase while mixing using the Silverson.

A successful stable emulsion was created which was more fluid than the emulsion created in Test 8, FIG. 5(f).

CONCLUSIONS

The results demonstrate the unexpectedly successful creation of stable oil-in-water asphalt emulsions using PCP as a stabilizer. Typically, the embodiments of the invention will include a wt % of PCP in the oil-in water emulsion of not less than around 1 wt % and, optionally, not more than around 45 wt %.

A measure of the proportion of PCP to be included in the emulsion is the PCP/(asphalt+PCP) ratio. Advantageously stable emulsions with and without addition of a surfactant substance can be obtained with a PCP/(asphalt+PCP) ratio of between 0.1 and 0.6. In certain embodiments the emulsion comprises a PCP/(asphalt+PCP) ratio of at least 0.01 and, optionally, at most 0.7.

Hence, the invention provides, in certain embodiments, a method of stabilizing an asphalt-in-water emulsion, the method comprising adding a purified coal product (PCP) to the emulsion. This method may be carried out in the absence of a further surfactant, such that the PCP provides adequate stabilization without the need for expensive additional surfactants. PCP can be added as a dry powder, as a wetcake up to 55% m water content, or as a slurry containing as much as 80% m water.

Although particular embodiments of the invention have been disclosed herein in detail, this has been done by way of example and for the purposes of illustration only. The aforementioned embodiments are not intended to be limiting with respect to the scope of the invention. It is contemplated by the inventors that various substitutions, alterations, and modifications may be made to the invention without departing from the spirit and scope of the invention.

Aspects and embodiments of the present invention are further exemplified by the following statements presented as a series of clauses:

Clause 1. A process for the production of an asphalt binder, the process comprising the steps of:
(i) providing a purified coal product (PCP), wherein the PCP is in particulate form, and wherein at least about 90% by volume (% v) of the particles are no greater than about 25 µm in diameter; wherein the PCP has an ash content of less than about 10 wt % and a water content of less than about 5 wt %; and
(ii) combining the PCP with an asphalt feedstock to create a combined blended mixture;
wherein the combined blended mixture comprises at least about 0.1 wt % and at most about 50 wt % PCP.

Clause 2. The process of clause 1, wherein the PCP has an ash content of less than about 6 wt %, suitably less than about 3 wt %; optionally not more than about 1.5 wt %.

Clause 3. The process of clause 1 or 2, wherein the PCP has a water content of less than about 2 wt %.

Clause 4. The process of any one of clauses 1 to 3, wherein the PCP has a sulfur content of less than about 2 wt %; optionally no greater than about 1 wt %, optionally no greater than about 0.5 wt %.

Clause 5. The process of any one of clauses 1 to 4, wherein the wt % of PCP in the composition is not less than 1 wt %, 5 wt %, 10 wt %, or 20 wt %.

Clause 6. The process of any one of clauses 1 to 5, wherein the wt % of PCP in the composition is not more than 45 wt %, 40 wt %, 30 wt %, or 20 wt %.

Clause 7. The process of any one of clauses 1 to 6, wherein at least about 90% by volume (% v) of the PCP particles are no greater than about 15 µm in diameter; optionally no greater than about 10 µm in diameter, optionally no greater than about 5 µm in diameter.

Clause 8. The process of any one of clauses 1 to 7, wherein the step of combining the PCP with an asphalt feedstock is carried out at a temperature of not less than about 60° C., suitably not less than about 80° C., typically not less than about 100° C. and optionally about 120° C.

Clause 9. The process of clause 8, wherein the combining step occurs using a high shear blender.

Clause 10. An asphalt/bitumen composition comprising a combination of an asphalt and a purified coal product (PCP), wherein the PCP is in particulate form, and wherein at least about 90% by volume (% v) of the particles are no greater than about 25 μm in diameter; wherein the PCP has an ash content of less than about 10 wt % and a water content of less than about 5 wt %; wherein the combined blend comprises at least about 0.1 wt % and at most about 50 wt % PCP.

Clause 11. The composition of clause 10, wherein the PCP has an ash content of less than about 6 wt %, suitably less than about 3 wt %; optionally not more than 1.5 wt %.

Clause 12. The composition of clause 10 or clause 11, wherein the PCP has a water content of less than about 2 wt %.

Clause 13. The composition of any one of clauses 10 to 12, wherein the PCP has a sulfur content of less than about 2 wt %; optionally no greater than about 1 wt %, optionally no greater than 0.5 wt %.

Clause 14. The composition of any one of clauses 10 to 13, wherein the wt % of PCP in the composition is not less than 1 wt %, 5 wt %, 10 wt %, or 20 wt %.

Clause 15. The composition of any one of clauses 10 to 14, wherein the wt % of PCP in the composition is not more than 45 wt %, 40 wt %, 30 wt %, or 20 wt %.

Clause 16. The composition of any one of clauses 10 to 16, wherein at least about 90% by volume (% v) of the PCP particles are no greater than about 15 μm in diameter; optionally no greater than about 10 μm in diameter, optionally no greater than about 5 μm in diameter.

Clause 17. An asphalt concrete mix, wherein the asphalt concrete comprises:
  an asphalt binder comprising a combination of an asphalt and a purified coal product (PCP), wherein the PCP is in particulate form, and wherein at least about 90% by volume (% v) of the particles are no greater than about 25 μm in diameter; wherein the PCP has an ash content of less than about 10 wt % and a water content of less than about 5 wt %; wherein the combined blended mixture comprises at least around 0.1 wt % and at most about 50 wt % PCP; and
  an aggregate.

Clause 18. The asphalt concrete mix of clause 17, wherein the mix further comprises one or more additives or fillers.

Clause 19. A method of using a purified coal product (PCP), wherein the PCP is in particulate form, and wherein at least about 90% by volume (% v) of the particles are no greater than about 25 μm in diameter; wherein the PCP has an ash content of less than about 5 wt % and a water content of less than about 5 wt %, as an additive for increasing the stiffness of an asphalt binder.

Clause 20. A method of using a purified coal product (PCP), wherein the PCP is in particulate form, and wherein at least about 90% by volume (% v) of the particles are no greater than about 25 μm in diameter; wherein the PCP has an ash content of less than about 5 wt % and a water content of less than about 5 wt %, as an additive for increasing the upper temperature performance grade of an asphalt concrete composition.

The invention claimed is:

1. A seal coat composition comprising an oil-in-water emulsion, the oil-in-water emulsion comprising water, an asphalt, and a purified coal product (PCP), wherein the PCP is in particulate form, wherein at least about 90% by volume (% v) of the particles are no greater than about 25 μm in diameter; and wherein the PCP has an ash content of less than about 10 wt %.

2. The seal coat composition of claim 1, wherein the PCP has an ash content of less than about 6 wt %.

3. The seal coat composition of claim 1, wherein the PCP has an ash content of less than about 3 wt %.

4. The seal coat composition of claim 1, wherein the PCP has a sulfur content of less than about 2 wt %.

5. The seal coat composition of claim 1, wherein the wt % of PCP in the oil-in water emulsion is not less than about 1 wt %.

6. The seal coat composition of claim 1, wherein the wt % of PCP in the oil-in water emulsion is not more than about 45 wt %.

7. The seal coat composition of claim 1, wherein the emulsion comprises a PCP/(asphalt+PCP) ratio of at least 0.01.

8. The seal coat composition of claim 1, wherein the emulsion comprises a PCP/(asphalt+PCP) ratio of at most 0.7.

9. The seal coat composition of claim 1, wherein the emulsion comprises a PCP/(asphalt+PCP) ratio of between 0.1 and 0.6.

10. The seal coat composition of claim 1, wherein the seal coat composition does not comprise a surfactant.

11. The seal coat composition of claim 1, wherein the seal coat composition comprises a surfactant.

12. The seal coat composition of claim 11, wherein the surfactant is selected from the group consisting of: an anionic surfactant; a cationic surfactant and a non-ionic surfactant.

13. The seal coat composition of claim 1, wherein the emulsion comprises a mineral filler material.

14. The seal coat composition of claim 13, wherein the mineral filler material is a clay.

15. The seal coat composition of claim 1, wherein the oil-in-water emulsion comprises at least about 30 by mass (% m) water.

16. The seal coat composition of claim 1, wherein the oil-in-water emulsion comprises at most about 90 by mass (% m) water.

17. The seal coat composition of claim 1, wherein the PCP is in the form of a wetcake.

18. The seal coat composition of claim 17, wherein the wetcake comprises up to 55 by mass (% m) water.

19. A method of stabilizing an asphalt-in-water emulsion to form a seal coat composition, the method comprising adding a purified coal product (PCP) to the emulsion, thereby forming the seal coat composition, wherein:
  the PCP is in particulate form;
  at least about 90% by volume (% v) of the particles are no greater than about 25 μm in diameter;
  the PCP has an ash content of less than about 10 wt %; and
  the PCP is added in an amount to the emulsion such that the emulsion comprises a PCP/(asphalt+PCP) ratio of at least 0.01.

20. The method of claim 19, wherein the PCP is added in an amount to the emulsion such that the emulsion comprises a PCP/(asphalt+PCP) ratio of at most 0.7.

21. The method of claim 19, wherein the PCP is added in an amount to the emulsion such that the emulsion comprises a PCP/(asphalt+PCP) ratio of between 0.1 and 0.6.

22. The method of claim 19, wherein the PCP is added in place of a surfactant.

* * * * *